(12) United States Patent
Davidson (10) Patent No.: US 12,520,833 B2
(45) Date of Patent: Jan. 13, 2026

(54) ADJUSTABLE FISHING ROD HOLDER WITH A RETRACTABLE STAKE

(71) Applicant: Rail Holdings, LLC, Mahwah, NJ (US)

(72) Inventor: Casey Davidson, Charleston, SC (US)

(73) Assignee: Rail Holdings, LLC, Mahwah, NJ (US)

( * ) Notice: Subject to any disclaimer, the term of this patent is extended or adjusted under 35 U.S.C. 154(b) by 6 days.

(21) Appl. No.: 18/452,012

(22) Filed: Aug. 18, 2023

(65) Prior Publication Data

US 2025/0057136 A1    Feb. 20, 2025

(51) Int. Cl.
*A01K 97/10*    (2006.01)

(52) U.S. Cl.
CPC .................................. *A01K 97/10* (2013.01)

(58) Field of Classification Search
CPC .................................................... A01K 97/10
USPC .................. 43/21.2; 248/511, 530, 532, 533
See application file for complete search history.

(56) References Cited

U.S. PATENT DOCUMENTS

| | | | | |
|---|---|---|---|---|
| 2,564,065 A * | 8/1951 | Jaden | ..................... | A01K 97/10 248/533 |
| 2,999,660 A * | 9/1961 | Kurtz | ..................... | A01K 97/10 248/518 |
| 3,339,869 A * | 9/1967 | Andersen | ............... | A01K 97/10 248/156 |
| 3,645,028 A | 2/1972 | Rayburn | | |
| 4,506,468 A * | 3/1985 | Willhite | ................. | A01K 97/10 43/17 |
| 4,993,346 A * | 2/1991 | Rupp | ..................... | A01K 91/08 114/361 |
| 5,187,892 A * | 2/1993 | Gutierrez | ............... | A01K 97/10 248/156 |
| 5,349,775 A | 9/1994 | Mondares | | |
| 5,639,057 A * | 6/1997 | Yeomans | .................. | E06C 7/46 248/156 |
| 6,547,203 B1 * | 4/2003 | Willard | ............... | E04H 12/2223 248/530 |
| 8,695,268 B2 * | 4/2014 | Gouthro | ............... | A01K 97/125 43/17 |
| 11,564,383 B2 * | 1/2023 | Morgan, Jr. | ......... | A01K 97/125 |
| 2014/0137459 A1 * | 5/2014 | Mora | ..................... | A01K 97/10 43/17 |
| 2014/0352196 A1 | 12/2014 | Copeland | | |
| 2021/0045372 A1 * | 2/2021 | Gravely | ................. | A01K 87/04 |

FOREIGN PATENT DOCUMENTS

| | | |
|---|---|---|
| DE | 10347263 A1 | 5/2005 |
| KR | 200490275 Y1 | 10/2019 |

\* cited by examiner

*Primary Examiner* — William L Gmoser
(74) *Attorney, Agent, or Firm* — Dinsmore & Shohl LLP (57) ABSTRACT

The embodiments are directed to rod holders including a fastener, a stake, and a tube. The fastener includes a head and a body. The stake includes a first end, a second end, and an elongated slot along a longitudinal direction of the stake. The tube includes a receiving end, a bottom end, and a boss running radially into the tube between the receiving end and the bottom end, where the receiving end is operable to removably receive a lower end of a rod. The body of the fastener mates with the elongated slot and is removably coupled to the boss such that the stake is slidably coupled to the tube and movable between a retracted position and an extended position. The head of the fastener is removably coupled to the stake to secure the stake from sliding along a longitudinal direction of the tube.

17 Claims, 6 Drawing Sheets

ADJUSTABLE FISHING ROD HOLDER WITH A RETRACTABLE STAKE

TECHNICAL FIELD

The present disclosure relates to a rod holder, and more particularly, to an adjustable fishing rod holder.

BACKGROUND

Fishing is a recreational pastime that demands patience and waiting for fish to take the bait. However, it can be inconvenient for users to constantly hold their fishing rods while at a particular location or carrying out other tasks. Additionally, some users may wish to enhance their fishing efficiency by using multiple fishing rods. Consequently, there is a need for users to secure their fishing rods or poles, allowing them to free up their hands.

SUMMARY

The present application discloses one or more of the features recited in the appended claims and/or the following features which alone or in any combination, may comprise patentable subject matter.

The disclosed embodiments are directed to adjustable fishing rod holders that incorporate retractable stakes. The rod holder can receive a fishing rod that is further secured in place by sliding the stake to an exposed position and impaling the stake into the ground at a sharp end of the stake. The extended length of the stake may vary by adjusting the relative position of the stake to a tube of the rod holder. The extendable nature of the stake grants the rod holder the ability to secure the receiving fishing rod at varying heights and angles. Alternatively, the stake can be moved to a retracted position to be devoid of any exposed sharp elements. By moving and securing the stake to the retracted position, the rod holder becomes portable and prioritizes safety during storage and transportation, mitigating any potential hazards associated with handling.

According to some embodiments, a rod holder may include a fixture mechanism, a stake comprising a first end, a second end, and an elongated slot along a longitudinal direction of the stake, a tube comprising a receiving end, a bottom end, and a pin radially projected from the tube, where the receiving end is operable to removably receive a lower end of a rod, wherein the pin mates with the elongated slot such that the stake is slidably coupled to the tube and movable between a retracted position and an extended position, and wherein one of the fixture mechanism or the pin is removably coupled to the other of the fixture mechanism and the pin to secure the stake from sliding along a longitudinal direction of the tube.

In some embodiments, the rod holder may further comprises a second fixture mechanism, a second elongated slot on the stake, and a second pin on the tube, wherein the second elongated slot is parallel to the elongated slot, the second pin is projected from the tube between the receiving end and the bottom end and is operable to mate with the second elongated slot, and the second fixture mechanism is removably coupled to the second pin. In the retracted position, the second end of the stake may be positioned next to or further back than the bottom end of the tube.

In some embodiments, the tube may be a circular tube, a square tube, a rectangular tube, a triangular tube, an oval tube, an elliptical tube, or a polygon tube. The stake may be a pointed stake, a cylindrical stake, a convex stake, a tapered stake, or a square stake. The stake may be an L-shape plate stake comprising two plates jointed with a shared longitude edge to form an angle. The second end of the stake may be a sharp tip or a pointed end, operable to be impaled into a surface. The fixture mechanism may be a nut, a washer, a clamp, or a clip.

In some embodiments, the fixture mechanism may be operable to be threaded onto the pin to be tightened to secure the stake from sliding along the longitudinal direction of the tube.

In some embodiments, the rod holder may further include a mounting mechanism operable to secure said rod or a pole to the receiving end, the mounting mechanism is a clamp, a screw, or a bracket.

In some embodiments, the tube may further include a fishing pole slot disposed at the receiving end to removably receive said rod or a fishing pole. The fishing pole slot may be a horizontal pole holding slot, a vertical pole holding slot, or an adjustable pole holding slot.

According to some embodiments, a rod holder may include a fastener comprising a head and a body, a stake comprising a first end, a second end, and an elongated slot along a longitudinal direction of the stake, a tube comprising a receiving end, a bottom end, and a boss running radially into the tube between the receiving end and the bottom end, where the receiving end is operable to removably receive a lower end of a rod, wherein the body of the fastener mates with the elongated slot and is removably coupled to the boss such that the stake is slidably coupled to the tube and movable between a retracted position and an extended position, and the head of the fastener is removably coupled to the stake to secure the stake from sliding along a longitudinal direction of the tube.

In some embodiments, the boss may be a threaded boss, a clearance boss, a counterbore boss, or a tapered boss. The body of the fastener may be threaded to be removably coupled to the boss. The boss may be radially extended into a hollow space inside the tube.

In some embodiments, in the retracted position, the second end of the stake may be positioned next to or further back than the bottom end of the tube.

In some embodiments, tube may be a circular tube, a square tube, a rectangular tube, a triangular tube, an oval tube, an elliptical tube, or a polygon tube. The stake may be a pointed stake, a cylindrical stake, a convex stake, a tapered stake, a square stake, or an L-shape plate stake comprising two plates jointed with a shared longitude edge to form an angle. The second end of the stake may be a sharp tip or a pointed end, operable to be impaled into a surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure involves adjustable fishing rod holders with a sliding stake. The rod holder includes a tube to receive a fishing rod and a stake to be impaled into the ground to secure the rod holder. The stake may be adjusted to move or slide along the tube between a retracted position and an extended position. This will enable users to customize the angle and position of the fishing rod to accommodate varying rod lengths, reel sizes, and fishing techniques. When the fishing rod is secured in place, a user may be hands-free to attend to other tasks or relax while waiting for a bite. The rod holder provides stability and ensures that the fishing rod remains securely anchored and minimizes the risk of the fishing rod being pulled into the water or getting damaged. The rod holder also increases fishing efficiency such that a user can monitor multiple lines simultaneously, allowing a user to cover more fishing spots and increase their chances of catching fish.

The stake may be moved or slidably adjusted to a retracted position such that the pointed or sharp end operable to be impaled into the ground may be positioned next to or further back than the bottom end of the tube. In other words, the sharp end of the stake is unexposed in this retracted position. By retracting the sharp end of the stake, the risk of accidentally damaging the pointed or sharp end or causing harm to other objects or people is minimized. This is especially useful when transporting or storing the rod holder, as it reduces the chances of puncturing or scratching other gear or surfaces. Further, with the retractable sharp end, a user can easily set up and remove the rod holder from the ground and thus simplifying the process of deploying and retracting the stake, making it desirable for anglers. By protecting the sharp end of the stake when not in use, it helps preserve the integrity of the rod holder and prevent it from becoming dull or damaged over time.

Throughout the disclosure, the rod holder refers to, without limitations, a fish rod holder, a rod rest, a rod support, or other terms conveying the same concept of a device or mechanism used to hold or support a rod in place. A tube refers to, without limitations, a cylinder, a pipe, a tubular component, a hollow structure-circular or other cross-sectional shape, or any structure describing an elongated object with a space inside. A stake refers to, without limitations, a post, a peg, an anchor, a spike, or any object describing a long, pointed object that is driven into the ground or another surface to provide stability or support.

Various embodiments of the adjustable fishing rod holders with a sliding stake are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 1:
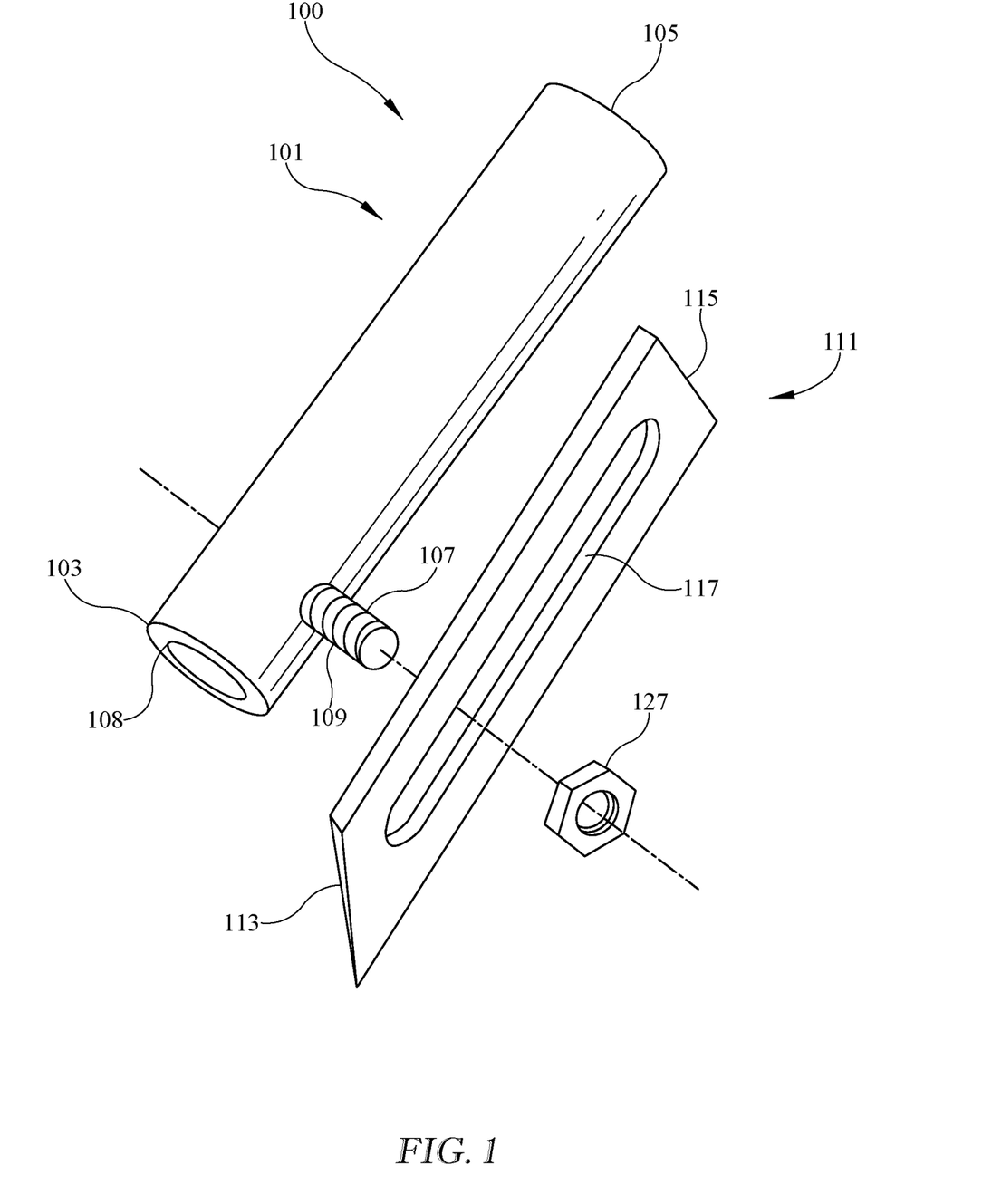
FIG. 1 schematically depicts a rod holder with a pin on a tube of the present disclosure, according to one or more embodiments shown and described herein.
Figure 2:
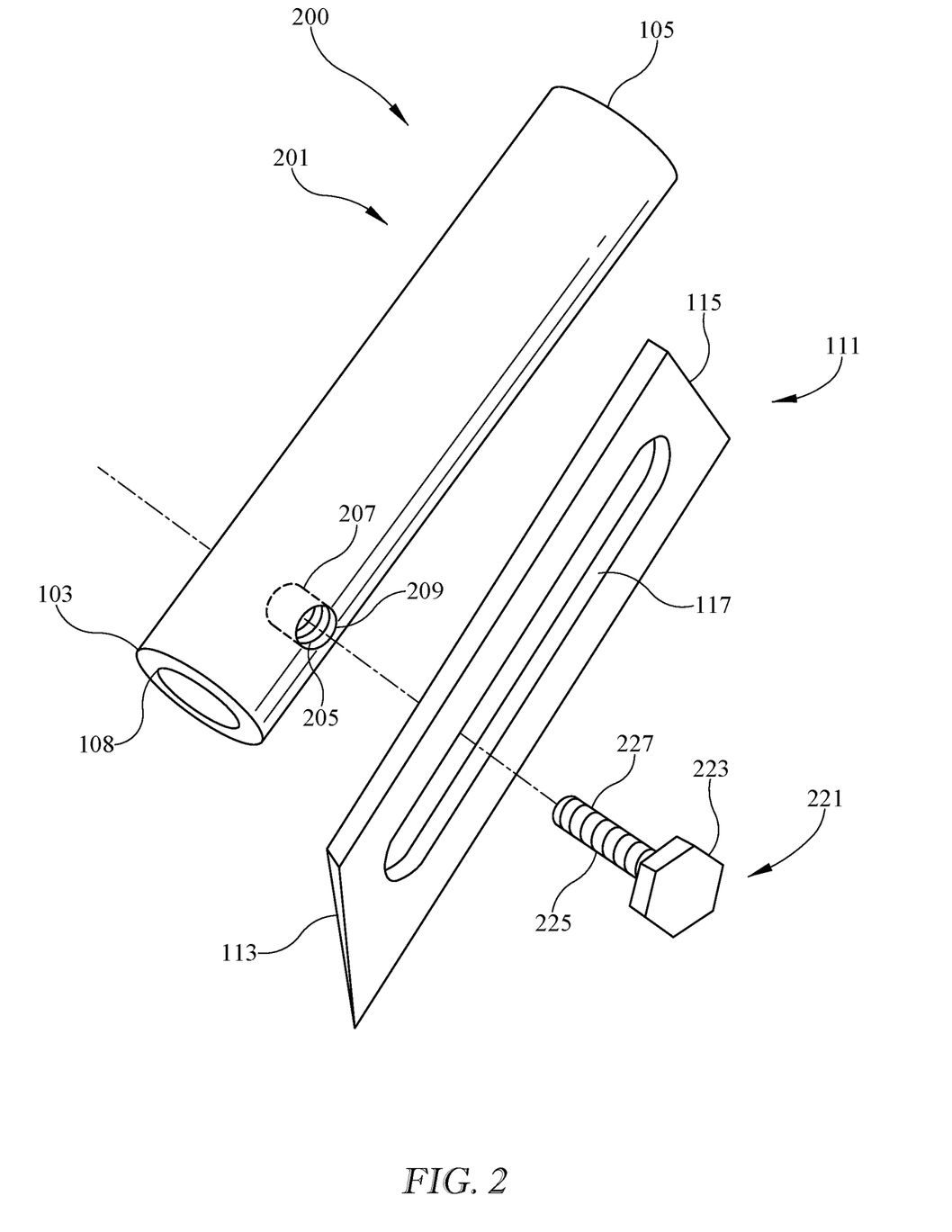
FIG. 2 schematically depicts a rod holder with a boss formed on or in a tube of the present disclosure, according to one or more embodiments shown and described herein.
Figure 6A:
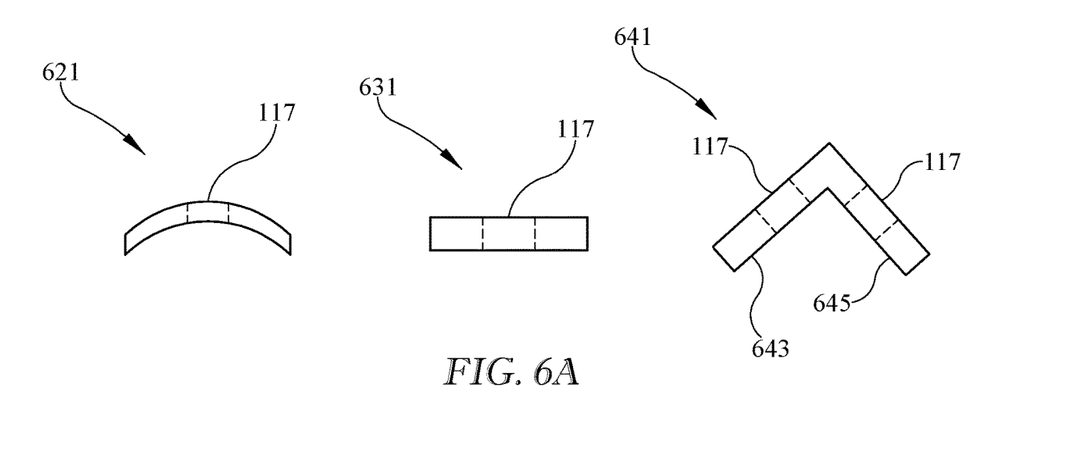
FIG. 6A schematically depicts a cross-sectional view of different shapes of the stake of the present disclosure, according to one or more embodiments shown and described herein.
Figure 6B:
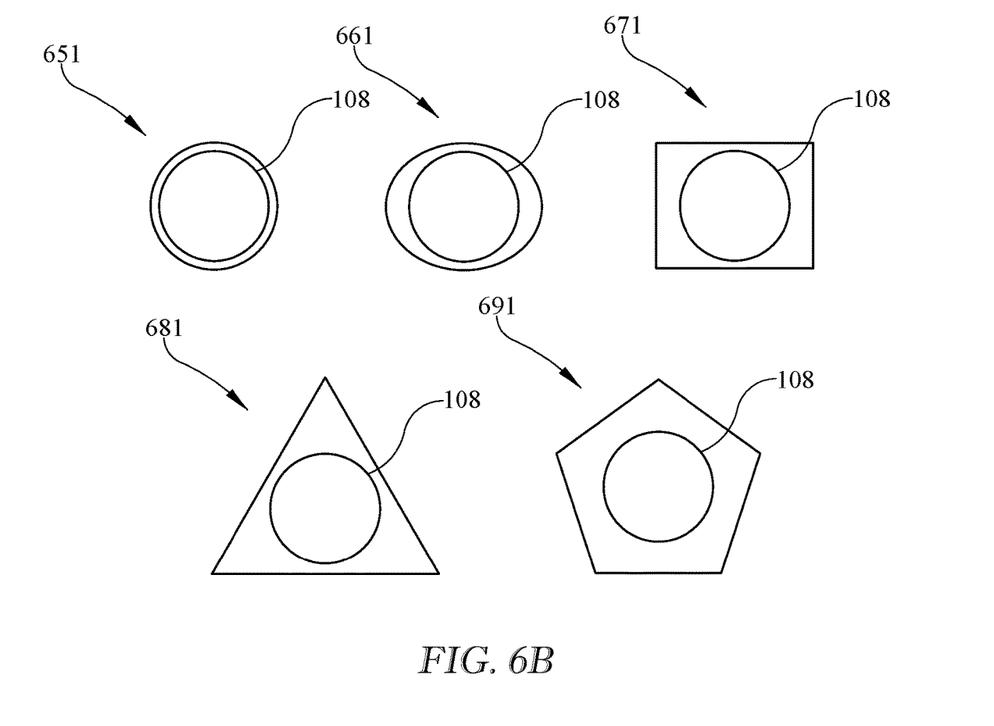
FIG. 6B schematically depicts a cross-sectional view of different shapes of the tube of the present disclosure, according to one or more embodiments shown and described herein.

Turning to the figures, FIG. 1 schematically depicts a rod holder with a pin on a tube. The rod holder 100 includes a tube 101, a stake 111, and a fixture mechanism 127. The tube 101 includes a receiving end 105, a bottom end 103, and a pin 107 radially projected from the tube 101. The tube 101 has an axial length and a cross-section shape. The cross-section shape of the tube 101 may be, without limitations, circular, oval, rectangular, triangular, or polygon (e.g. as illustrated in FIG. 6B). The tube 101 includes a hollow area 108 elongated along a longitudinal direction of the tube 101. The hollow area 108 is an unfilled space within the tube 101. The hollow area 108 may be, without limitations, round, rectangular, square, or any shape that operably accommodates a lower part of a rod or a pole. The hollow area 108 inside the tube 101 may be through or partially through the body of the tube 101. The tube 101 may have a cylindrical shape with an outer diameter and an inner diameter. The pin 107 is radially projected from the outer surface of the tube 101 or is extending in the radial direction of the tube 101. The pin 107 may include threads 109 or other retaining or fastening features. The pin 107 may have a cylindrical shape with a base diameter and a length. The pin 107 may be projected from a position of the outer surface of the tube closer to the bottom end 103 than the receiving end 105. The length of the pin 107 may be greater than a thickness of the stake 111, such that at least a part of the pin 107 is extended to receive the fixture mechanism 127 when the stake 111 is coupled to the tube 101. Alternatively, the tube 101 may have a boss such that a fixture mechanism 127 comprising a fastener 221 (e.g. as illustrated in FIG. 2) may extend into the tube. The pin 107 may be fastened through the tube 101, or may be welded to the tube 101, or may be otherwise extending from the exterior of the tube 101.

Figure 3A:
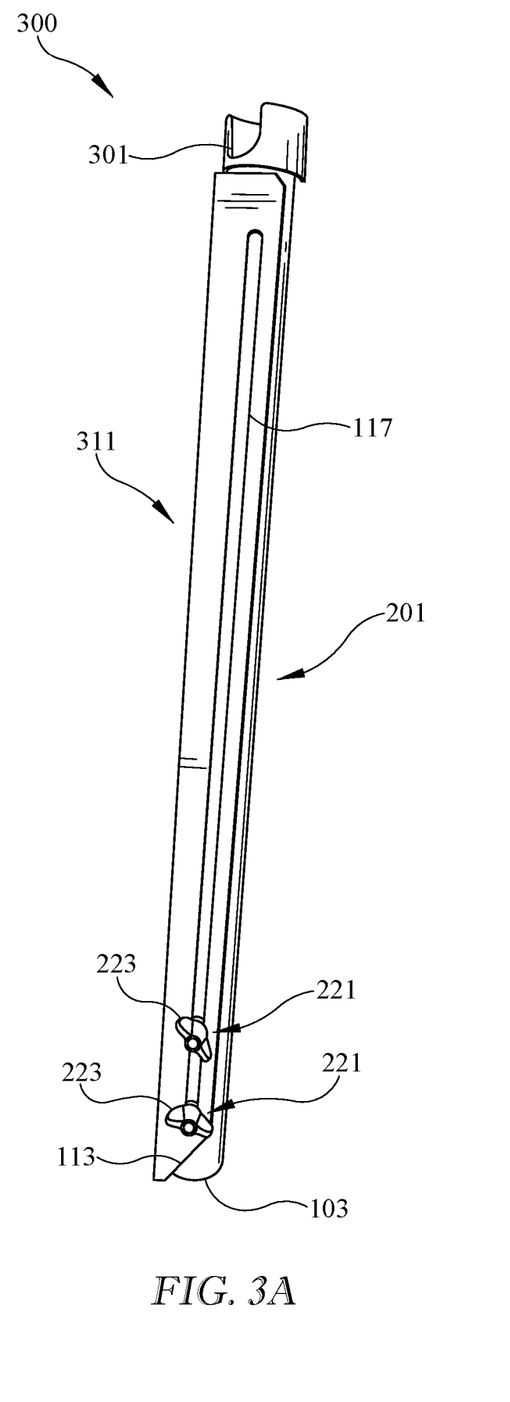
FIG. 3A schematically depicts a rod holder having a stake in a retracted position of the present disclosure, according to one or more embodiments shown and described herein.
Figure 3B:
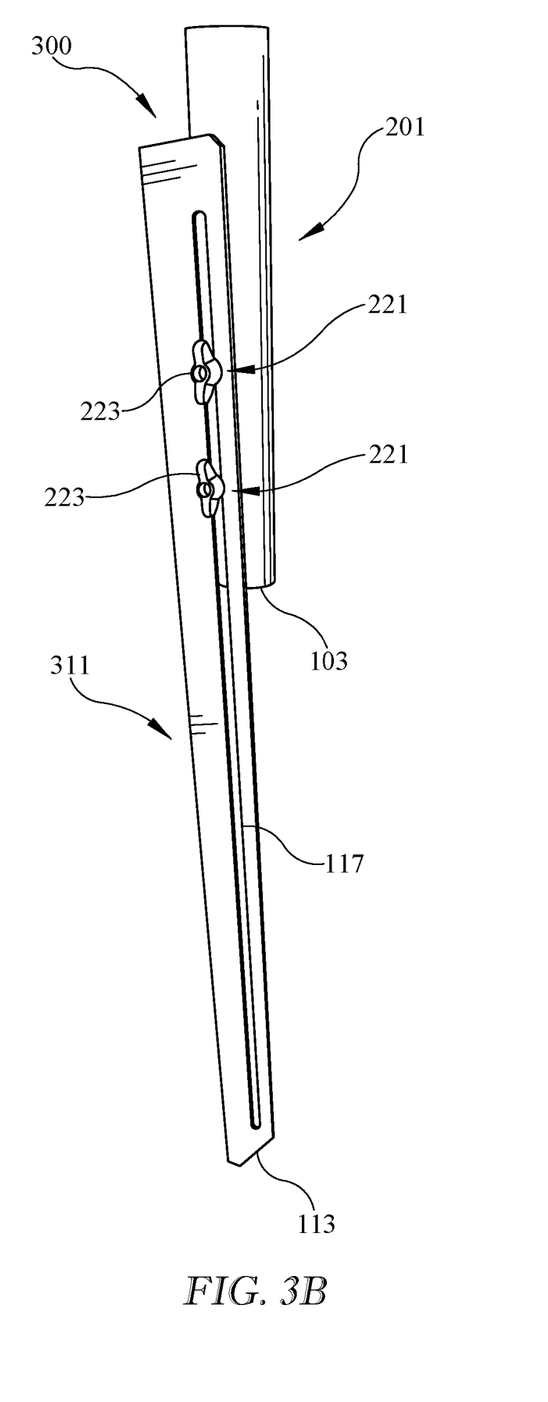
FIG. 3B schematically depicts a rod holder having a stake in an extended position of the present disclosure, according to one or more embodiments shown and described herein.

The stake 111 includes a first end 115, a second end 113, and an elongated slot 117 along a longitudinal direction of the stake. The second end 113 may be a pointed end or a sharp tip to be operably impaled into the ground or surfaces of any desired objects. The slot 117 has a length along the longitudinal direction of the stake 111 and a width perpendicular to the longitudinal direction of the stake. The width of the slot 117 may be equal or greater than the diameter of the pin 107 such that the pin 107 may be inserted through the slot 117 to allow the stake 111 to be coupled to the tube 101. The pin 107 may mate with the slot 117 such that the stake 111 is slidably coupled to the tube 101 and movable along the longitudinal direction of the tube 101. In some embodiments, the cross-section of the stake 111 is in a shape complementary to the outer surface of the tube 101 such that the stake 111 may have only one degree of freedom along the longitudinal direction of the tube 101. For example, when the tube 101 may have a cylindrical shape, the stake 111 may have a complementary cylindrical shape or convex shape (e.g. a convex stake 621 as illustrated in FIG. 6A). In some embodiments, two or more pins 107 are radially projected from the outer surface of the tube 101 and the two or more pins 107 are inserted through the slot (e.g. as illustrated in FIGS. 3A and 3B) such that the stake 111 may be restricted to move along the longitudinal direction of the tube 101. In some embodiments, the tube 101 may further include a track to be slidably coupled to the stake 111 such that the stake 111 may slide along the longitudinal direction of the tube 101. The stake may include a complementary part, such as a guide or protrusion that fits into the track of the tube 101. This arrangement may restrict the movement of the stake other than the longitudinal axis of the tube. The stake 111 can freely slide back and forth along the length of the tube 101, utilizing the track and guide mechanism.

The fixture mechanism 127 is removably coupled to the pin 107. The fixture mechanism 127 may be, without limitations, a nut, a washer, a clamp, or a clip. The fixture mechanism 127 may include, without limitations, one or more handles, a fluted knob, a star knob, a gripping ring, or any mechanism to allow a user to turn the fixture mechanism clockwise or counterclockwise by hands, or with tools, or both. The fixture mechanism 127 may be coupled with the pin 107 such that frictions are created between the fixture mechanism 127 and the stake 111, and between the stake 111 and the tube 101. The frictions may maintain the stake 111 in place and prevent the stake 111 from sliding along the longitudinal direction of the tube 101.

The fixture mechanism 127 may be coupled with the pin 107 through, without limitations, a threaded coupling, a quick-release coupling, a magnetic coupling, or any mechanism to interlock the pin 107 and the fixture mechanism 127 to create a secure connection. In some embodiments, the fixture mechanism 127 may be threadedly coupled to the pin 107. The pin 107 may have external threads 109, while the fixture mechanism 127, such as a nut or threaded collar, may have corresponding internal threads. A secure connection may be established by rotating and screwing the fixture mechanism 127 onto the threaded portion 109 of the pin 107. The fixture mechanism 127 may be unscrewed to detach the fixture mechanism 127 from the pin 107. In some embodiments, the fixture mechanism 127 may be coupled to the pin 107 through a quick-release mechanism. The fixture mechanism 127 may include a quick-release mechanism, such as a lever or cam, to secure the pin 107. The fixture mechanism 127 may have a receptacle or latch that engages with the pin 107. In some embodiments, the fixture mechanism 127 may be magnetically coupled to the pin 107. The pin 107 and fixture mechanism 127 may be made of magnetic materials that attract each other and holds the fixture mechanism 127 and the stake 111 in place. Additionally in some configurations, and as will be described further herein, the fixture mechanism 127 may be fixed to the tube 101 and pin 107 may be connectable to the fixture mechanism 127 in order to retain the stake 111, in an arrangement that is opposite to what is shown in FIG. 1.

When the fixture mechanism 127 is coupled to the pin 107, the stake 111 may be secured in place and may not be slidably moved along the longitudinal direction of the tube 101. For example, when the fixture mechanism 127 is threadedly coupled to the pin 107, the fixture mechanism 127 is tightened to sandwich the stake 111 between the tube 101 and the fixture mechanism 127. This stops the stake 111 from sliding along the longitudinal direction of the tube 101.

Referring to FIG. 2, a rod holder 200 with a boss 207 to receive a fixture mechanism comprising a fastener 221 of the present disclosure is depicted. The rod holder 200 includes a pin or fastener 221, a tube 201, and a stake 111. The pin or fastener 221 includes a head 223 and a body 227. The stake 111 includes a first end 115, a second end 113, and an elongated slot 117 along a longitudinal direction of the stake 111. The second end 113 may be a sharpened or a pointed end, operable to be impaled into a surface. The tube 201 includes a receiving end 105 operable to removably receive a lower end of a fishing rod, a bottom end 103, and a boss 207 running radially into the tube between the receiving end and the bottom end.

The pin or fastener 221 may form a non-permanent joint to connect the stake 111 and the tube 201. When the fastener 221 is loosened or removed, the stake 111 and the tube 201 may move relative to the tube 201, to extend or retract, or may be removed from the tube 201 without incurring damage. The fastener 221 may be a screw, a nail, a nut and bolt, a washer, an anchor, or a rivet. The bolt may be, without limitations, a carriage bolt, a flange bolt, a hex-head bolt, a square-head bolt, or an Allen bolt. The fastener 221 includes a head 223 and a body 227. The head 223 may include, without limitations, one or more handles, a fluted knob, a star knob, ringed gripping structure, or any mechanism to allow a user to turn the fixture mechanism clockwise or counter-clockwise by hands, or with tools, or both. Additionally, a non-threaded pin may be spring biased to a tightened position, but may be forced against a biasing spring so that the stake may be moved relative to the tube.

The body 227 of the pin or fastener 221 may mate with the elongated slot 117. The body 227 may insert through the slot 117 and further insert into the boss 207 through an opening 209 on the outer surface of the tube 201. The pin or fastener 221 may be removably coupled to the boss 207 such that the stake 111 is slidably coupled to the tube 201 and movable along the longitudinal direction of the tube 201.

The head 223 of the fastener 221 is operable to be removably coupled to the stake 111 to secure the stake 111 from sliding along a longitudinal direction of the tube 201. In some embodiments, after the fastener 221 is tightened by coupling the body 227 to the boss 207, for example, threadedly coupled to the boss 207, the head 223 of the fastener 221 may frictionally contact with the surface of the stake 111 and further force the stake 111 to frictionally contact with the outer surface of the tube 201. The frictions between the stake 111 and the tube 201, and between the head 223 and the stake 111 may keep the stake 111 in place and prevent the stake 111 from drifting in relation to the tube 201. The pin or fastener 221 may be retracted and loosened to reduce the interactions and frictions between the tube 201 and the stake 111 and between the stake 111 and the fastener 221. After retraction of the fastener 221, the stake 111 may be operable to move in relation to the tube 201, for example, but without limitations, slidable movement.

The boss 207, for example and without limitation, a protruding feature on inside of the tube 201, includes an outer end as the opening 209 at the surface of the tube 201, an inner end inside the tube 201, and a depth into the wall of the tube 201. In some embodiments, the boss 207 may be a through hole having an inner end at the inner surface of the tube 201 and is exposed to the hollow space inside the tube 201. The opening 209 is configured to receive the body 227 of the fastener 221 and allow the body 227 to further insert into the boss 207. The boss 207 may be, without limitations, a threaded boss, a clearance boss, a counterbore boss, or a tapered boss.

In some embodiments, the boss 207 may be a threaded boss that is threaded to accept a pin or fastener 221, for non-limiting example a screw or bolt. The thread is a spiral groove that is machined into the surface of the boss 207. In some embodiments, the boss 207 may be a clearance boss that allows a fastener to pass through without binding. The diameter of the clearance boss may be slightly larger than the diameter of the fastener. This allows for a small amount of clearance between the fastener and the boss, which prevents the fastener from binding as it is inserted or removed. In some embodiments, the boss 207 may be a counterbore boss on the flat surface the tube 201 when the tube 201 is, without limitations, a triangular tube, a rectangular tube, or a polygon tube (e.g. as illustrated in FIG. 6B). The counterbore boss has a flat surface for the head of a screw or bolt to sit flush. The counterbore boss is larger than the diameter of the screw or bolt of the fastener 221, and it has a flat bottom. In some embodiments, the boss 207 may be a tapered boss that has a tapered bore. The tapered bore has the diameter of the boss decreases over the length of the boss, for example, without limitations, by 10% or 16%.

The boss 207 may engage with the pin or fastener 221 through, without limitations, threaded engagement, press-fit engagement, snap-fit engagement, expansion anchor engagement, or a camming interlocking engagement. In some embodiments, the fastener 221 may removably engage with the boss 207 through threaded engagement. The fastener 221 may include threads 225 on the body 227 and may be threadedly coupled to the boss 207, which includes threads 205 on the wall. The threads 225 on the fastener 221 and the boss 207 create a helical path that allows the fastener 221 to be inserted and tightened, forming a secure connection. In some embodiments, the fastener 221 may removably engage with the boss 207 through press-fit engagement. The fasteners 221 may be slightly larger in diameter than the boss 207, and the fastener 221 may be pressed or hammered into the boss 207 with force such that the interference fit between the fastener 221 and the boss 207 provides a tight and secure connection. In some embodiments, the fastener 221 may removably engage with the boss 207 through snap-fit engagement. The fastener 221 may be a plastic clip or a snap rivet having flexible or spring-like features to allow the fastener 221 to be inserted into the boss 207 with a snapping action. After inserted, the fastener 221 may expand or flex to engage with the walls of the boss 207 to secure the fastener in place.

Figure 4:
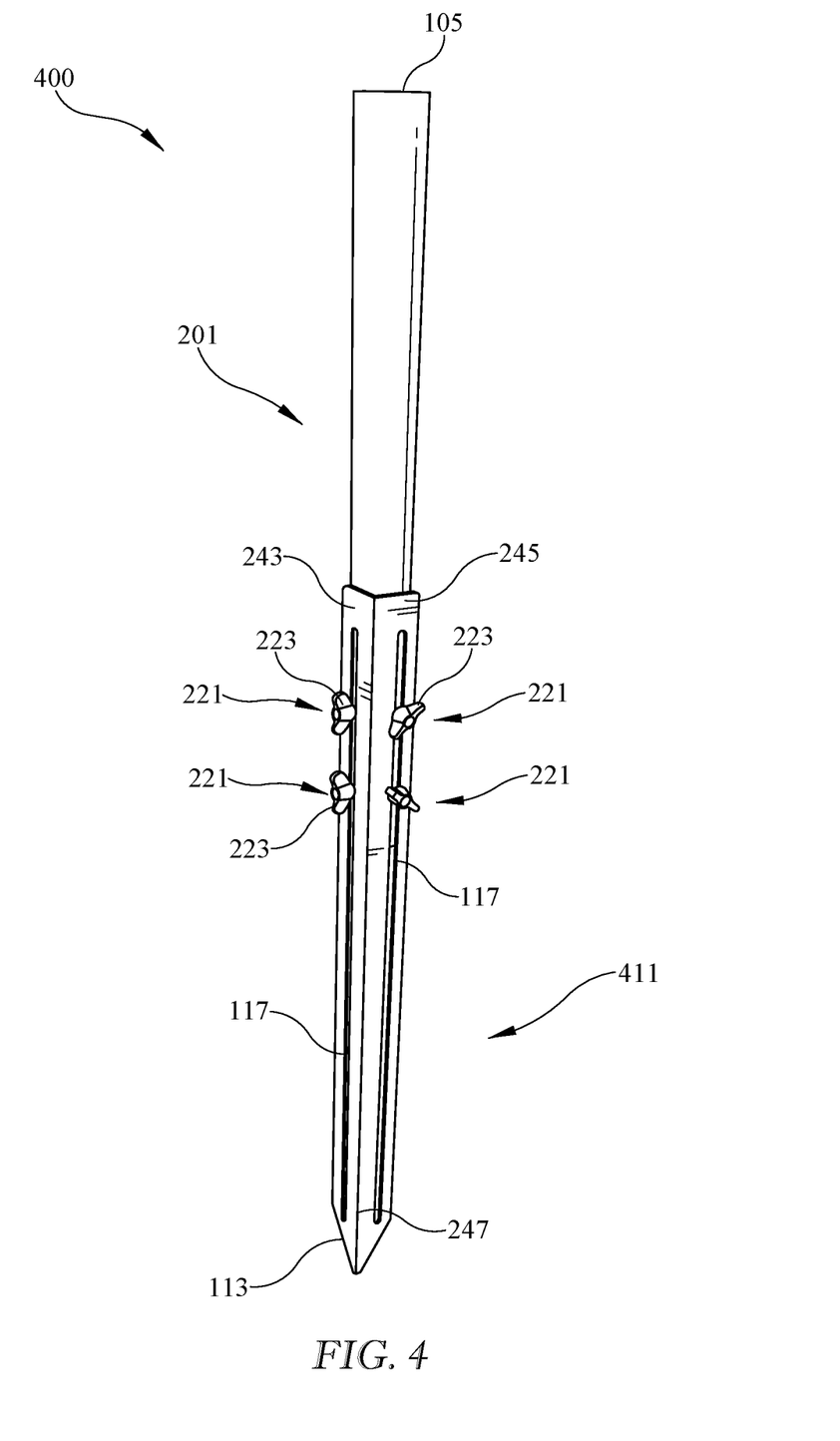
FIG. 4 schematically depicts a rod holder having an L-shape stake of the present disclosure, according to one or more embodiments shown and described herein.

Referring to FIGS. 3A and 3B, the stake 311 of the rod holder 300 in a retracted position and an extended position of the present disclosure are depicted. The rod holder 300 may include two or more fixture mechanisms 127 such as two or more fasteners 221. Each fastener 221 may include a head 223 and a body 227 (e.g. as illustrated in FIG. 2). The fixture mechanism 127, such as the head 223 of the fastener 221, may include, without limitations, one or more handles, a fluted knob, a star knob, or any mechanism to allow a user to turn the fixture mechanism 127 clockwise or counterclockwise by hands, or with tools, or both. When the fixture mechanism 127, such as the fastener 221, are not tightened to create interactions and fractioned engagement to keep the stake 311 in place, the stake 311 may move along the longitudinal direction of the tube 201 between a retracted position as illustrated in FIG. 3A, and an extended position as illustrated in FIG. 3B. In FIGS. 3A and 3B, the stake 311 may have one degree of freedom when the two fasteners 221, each is inserted through the slot 117 and further engaged with a boss 207 in the tube 201. At the retracted position, the extended position, or between the retracted position and the extended position, the fastener 221 or the fixture mechanism 127 may be tightened to secure the stake 311 in place such that the stake 311 may not move or slide in relation to the tube 201. The second end 113 of the stake 311 includes a sharp tip that is operable to be impaled into a surface or substrate, such as the ground. The stake 311 may be a L-shape stake that includes two plates (plate 643 and plate 645) joined with a shared longitudinal edge to form an angle (e.g. the stake 411 as illustrated in FIG. 4 and the stake 641 as illustrated in FIG. 6A). Each plates of the L-shape stake may include a slot 117 to engage with one or more fasteners 221.

As illustrated in FIG. 3A, the stake 311 is moved to a retracted position. In the retracted position, the second end 113 of the stake 311 may be positioned next to or further back than the bottom end 103 of the tube 201.

In some embodiments, as illustrated in FIG. 3A, the lower end of the slot 117 may be engaged with the head 223 and the body 227 of the fastener 221 to stop the stake 311 from any further retraction. At this point, the second end 113 is at the position next to the bottom end 103 of the tube 201. In some other embodiments, the lower end of the slot 117 may be not engaged with the fastener 221 when the second end 113 is retracted to position next to the bottom end 103. The stake 311 may retract further to have the second end 113 of the stake 311 be further back than the bottom end 103 when the lower end of the slot 117 is engaged with the fastener 221.

In some embodiments, the tube 201 may further include a fishing pole slot 301 disposed at the receiving end to removably receive a rod or a pole. The fishing pole slot 301 may be a horizontal pole holding slot, a vertical pole holding slot, or an adjustable pole holding slot. The horizontal pole holding slot may hold the rod or pole horizontally and the fishing rod or pole along with the rod holder 300 are inserted parallel to the ground. The vertical pole holding slot may be oriented vertically, enabling the rod or pole to be inserted upright. The adjustable pole holding slot may allow the user to modify the orientation of the slot with a mechanism that allows the slot to be set to a desired angle.

As illustrated in FIG. 3B, the stake 111 is moved to an extended position. When the rod holder 300 is inserted into a surface, the second end 113 of the stake 311 may be extended beyond the bottom end 103 of the tube 201 to be positioned more extended than the bottom end 103 of the tube 201. In the extended position, the rod holder 300 has an extended length compared with that of the retracted position. The extended stake 311, with its exposed second end 113, may be operated to penetrate partially into the ground or an object on the surface, while the bottom end 103 of the tube 201 remains elevated and does not come into contact with the surface. A user may adjust the extended length of the stake 311 and secure the stake 311 at a desired position.

Referring to FIG. 4, a rod holder 400 having an L-shape stake 411 of the present disclosure is depicted. The rod holder 400 may include an L-shape stake 411, a tube 201, and two or more fixture mechanisms 127 (e.g. as illustrated in FIG. 1) or two or more fasteners 221. the L-shape stake 411 includes two plates (plate 243 and plate 245) jointed with a shared longitudinal edge 247. The plate 243 and the plate 245 may form an angle at the cross-section of the L-shape stake 411 (e.g. a right angle in the L-shape stake 641 as illustrated in the FIG. 6A). The angle may be an acute angle, an obtuse angle, or a right angle. Each plate includes the slot 117 along the longitudinal direction of the L-shape stake 411. Each plate is configured to secure the stake by engaging with two fasteners 221 where the fasteners 221 may mate with the slots 117 and further coupled with the bosses 207 (e.g. as illustrated in FIG. 2) of the tube 201. The L-shape stake 411 may include two elongated slots 117 parallel to each other on the plate 243 and the plate 245. In some embodiments, there may be one or more slots 117 on each plate (the plate 243 and the plate 245) of the stake 411. The rod holder 400 may further include two or more pins or fasteners 107 (e.g. as illustrated in FIG. 1) projected from the tube 201 between the receiving end 105 and the bottom end 103 (e.g. as illustrated in FIG. 1). The pins 107 may be operable to mate with two or more elongated slots 117.

The receiving end 105 of the tube 201 may be used to receive a lower end of a rod or a pole. The receiving end 105 may provide a secure and stable connection with the rod or the pole, allowing the rod or pole to be inserted and held firmly in place within the tube 201. The rod or the pole may engage with the receiving end 105 through, without limitations, a friction fit, a set screw or clamp, a locking mechanism, a threaded connection, or any connections to secure the rod or pole in place. In some embodiments, the receiving end 105 may include a smaller inside diameter than the diameter of the rod or pole such that the pressure between the tube 201 and the rod may hold the two together securely. The receiving end 105 may have a set screw or a clamp mechanism that can be tightened to secure the rod or pole in place. The receiving end 105 may feature a locking mechanism such as a latch, clip, or spring-loaded mechanism. The receiving end 105 may have internal threads that match the external threads on the lower end of the rod or pole. In some embodiments, the receiving end 105 may include a mounting mechanism operable to secure the rod or pole to the receiving end 105. The mounting mechanism may be, without limitations, a clamp, a screw, or a bracket. For example, a clamp may be used to tighten the receiving end 105 to increase the pressure applied to the rod or pole and increase the friction force between the receiving end 105 and the rod or pole.

Figure 5:
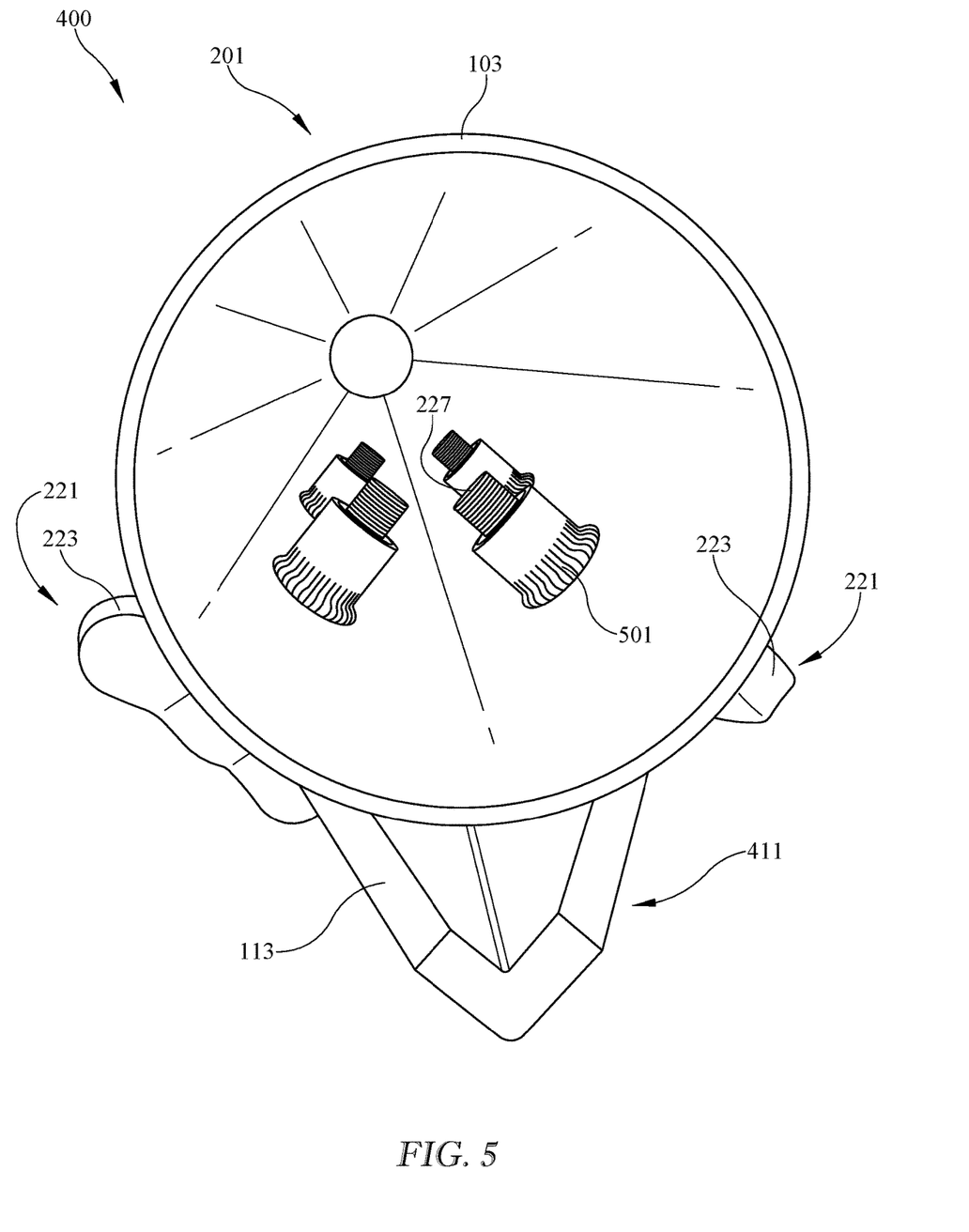
FIG. 5 schematically depicts a rod holder having a boss inside the tube of the present disclosure, according to one or more embodiments shown and described herein.

Referring to FIG. 5, a rod holder 400 having a boss 501 inside the tube of the present disclosure is depicted. The rod holder 400 may include the tube 201, the L-shape stake 411 with a second end 113, and two or more fasteners 221. The tube 201 may further include one or more bosses 501 radially extended into a hollow space inside the tube 201. The boss 501 may be integrated to the tube or may be welded coupled to the tube. The fastener 221 may include, without limitations, one or more handles, a fluted knob, a star knob, or any mechanism to allow a user to turn the fixture mechanism clockwise or counter-clockwise by hands, or with tools, or both. The body 227 of fastener 221 is operably to be removably coupled to the boss 501 through an opening 209 (e.g. as illustrated in FIG. 2) on the surface of the tube 201. The boss 501 may be fixed or removably engaged with the inner surface of the tube 201. The boss 501 may be positioned near the bottom end 103 of the tube 201 such that a lower part of the rod or pole may not interact with the boss 501 when received by the receiving end 105 (e.g. as illustrated in FIGS. 1 and 2).

Referring to FIGS. 6A and 6B cross-sectional views of various shapes of the stake and the tube of the present disclosure are depicted. The stake may be, without limitations, pointed stake, a cylindrical stake, a convex stake, a tapered stake, a square stake, or an L-shape stake. A pointed stake includes a sharp point at one end that can be driven into the ground. A cylindrical stake may include a smooth cylindrical shaft. A convex stake may include a curved, convex outward like the exterior of a sphere surface. A tapered stake may include a tapered shaft that becomes progressively smaller from the first end toward the second end. A square stake may include a square shaft or a square head attaching to the first end.

As illustrated in FIG. 6A, in some embodiments, the stake may be, without limitations, a convex stake 621, a plate stake 631, or an L-shape stake 641. Each stake may include the slot 117 at the center of the cross-section. The convex stake 621 may include a curved outer surface and a curved inner surface, parallel to each other. The curved inner surface may be complementary to the outer surface of the tube (e.g. the tubes 101 and 201 as illustrated in FIGS. 1 and 2). The plate stake 631 has a rectangular cross-section. The L-shape stake 641 includes two plates (plate 643 and plate 645) joined with a shared longitude edge to form an angle, where each plate may include a slot 117.

As illustrated in FIG. 6B, a tube may be, without limitations, a circular tube 651, a square tube, a rectangular tube 671, a triangular tube 681, an oval tube, an elliptical tube 661, or a polygon tube 691. The tube includes a hollow space 108 at the center that may be used to receive a rod or pole to form a connection. The hollow space 108 may include an opening of the hollow space 108 at the receiving end 105 (e.g. as illustrated in FIGS. 1 and 2) and/or at the bottom end 103 (e.g. as illustrated in FIGS. 1 and 2). The cross-section of the hollow space 108 may be, without limitations, round, slotted, keyhole-shaped, square, rectangular, or any shape matching the lower end of a rod or pole.

Throughout the disclosure, the materials made of the tube, the stake, the fixture mechanism, or the fastener may be, without limitations, plastic (such as Polyvinyl Chloride (PVC), nylon, or Fiberglass Reinforced Plastic (FRP)), metal (such as steel, brass, titanium, or aluminum), wood, bamboo, composite materials (such as PVC composites, fiberglass or carbon fiber).

It will be apparent to those skilled in the art that various modifications and variations can be made to the embodiments described herein without departing from the scope of the claimed subject matter. Thus, it is intended that the specification cover the modifications and variations of the various embodiments described herein provided such modifications and variations come within the scope of the appended claims and their equivalents.

The invention claimed is:

1. A rod holder comprising:
    a fixture mechanism;
    an L-shape stake comprising two plates, a first end, a second end, and an elongated slot on one of the plates along a longitudinal direction of the stake, the two plates joined along a longitude edge of each plate to form an angle;
    a tube comprising a receiving end, a bottom end, and a pin radially projected from the tube, where the receiving end is operable to removably receive a lower end of a rod;
    wherein:
    the pin mates with the elongated slot such that the L-shape stake is slidably coupled to the tube and movable between a retracted position and an extended position; and wherein one of the fixture mechanism or the pin is removably coupled to the other of the fixture mechanism or the pin to secure the stake from sliding along a longitudinal direction of the tube.

2. The rod holder of claim 1, wherein:
the rod holder further comprises a second fixture mechanism, a second elongated slot on the stake, and a second pin on the tube;
wherein:
the second elongated slot is parallel to the elongated slot;
the second pin is projected from the tube between the receiving end and the bottom end and is operable to mate with the second elongated slot; and
the second fixture mechanism is removably coupled to the second pin.

3. The rod holder of claim 1, wherein in the retracted position, the second end of the stake is positioned next to or further back than the bottom end of the tube.

4. The rod holder of claim 1, wherein the tube is a circular tube, a square tube, a rectangular tube, a triangular tube, an oval tube, an elliptical tube, or a polygon tube.

5. The rod holder of claim 1, wherein the second end of the stake is a sharp tip or a pointed end, operable to be impaled into a surface.

6. The rod holder of claim 1, wherein the fixture mechanism is a nut, a washer, a clamp, or a clip.

7. The rod holder of claim 1, wherein the fixture mechanism is operable to be threaded onto the pin to be tightened to secure the stake from sliding along the longitudinal direction of the tube.

8. The rod holder of claim 1, wherein the rod holder further comprises a mounting mechanism operable to secure said rod or a pole to the receiving end, the mounting mechanism is a clamp, a screw, or a bracket.

9. The rod holder of claim 1, wherein the tube further comprises a fishing pole slot disposed at the receiving end to removably receive said rod or a fishing pole.

10. The rod holder of claim 9, wherein the fishing pole slot is a horizontal pole holding slot, a vertical pole holding slot, or an adjustable pole holding slot.

11. A rod holder comprising:
a fastener comprising a head and a body;
an L-shape stake comprising two plates, a first end, a second end, and an elongated slot on one of the plates along a longitudinal direction of the stake, the two plates joined along a longitude edge of each plate to form an angle;
a tube comprising a receiving end, a bottom end, and a boss extending radially into the tube between the receiving end and the bottom end, where the receiving end is operable to removably receive a lower end of a rod;
wherein:
the body of the fastener mates with the elongated slot and is removably coupled to the boss such that the L-shape stake is slidably coupled to the tube and movable between a retracted position and an extended position; and
the head of the fastener is removably coupled to the stake to secure the stake from sliding along a longitudinal direction of the tube.

12. The rod holder of claim 11, wherein the boss is a threaded boss, a clearance boss, a counterbore boss, or a tapered boss.

13. The rod holder of claim 11, wherein the body of the fastener is threaded to be removably coupled to the boss.

14. The rod holder of claim 11, wherein the boss is radially extended into a hollow space inside the tube.

15. The rod holder of claim 11, wherein in the retracted position, the second end of the stake is positioned next to or further back than the bottom end of the tube.

16. The rod holder of claim 11, wherein the tube is a circular tube, a square tube, a rectangular tube, a triangular tube, an oval tube, an elliptical tube, or a polygon tube.

17. The rod holder of claim 11, wherein the second end of the stake is a sharp tip or a pointed end, operable to be impaled into a surface.

* * * * *